(No Model.)

L. N. LUSK.
GANG CORN PLANTER.

No. 271,722. Patented Feb. 6, 1883.

Attest.
John C Perkins
Daniel T Shaw

Inventor:
Lewis N Lusk
By Lucius C Veet
Atty

United States Patent Office.

LEWIS N. LUSK, OF ALAMO, MICHIGAN.

GANG CORN-PLANTER.

SPECIFICATION forming part of Letters Patent No. 271,722, dated February 6, 1883.

Application filed May 18, 1882. (No model.)

*To all whom it may concern:*

Be it known that I, LEWIS N. LUSK, a citizen of the United States, residing at Alamo, Kalamazoo P. O., county of Kalamazoo, State of Michigan, have invented a new and useful Gang Corn-Planter, of which the following is a specification.

The object of my invention is to construct a gang-wheel corn-planter adapted to readily conform itself to the surface of the soil, and to plant the corn in rows both ways of the field.

A further object is to construct an improved planter-wheel, substantially as hereinafter described.

Figure 1:
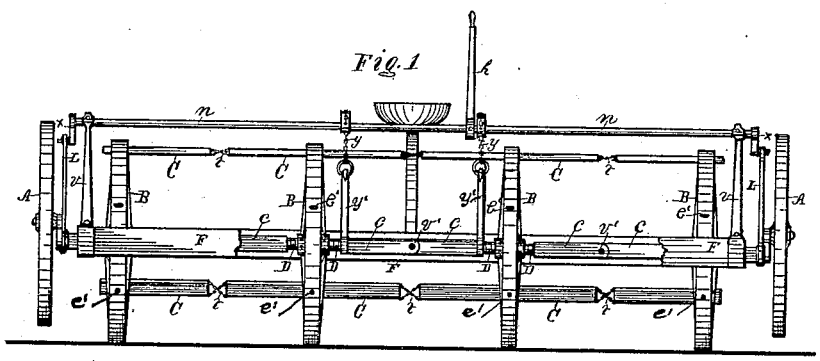
Figure 2:
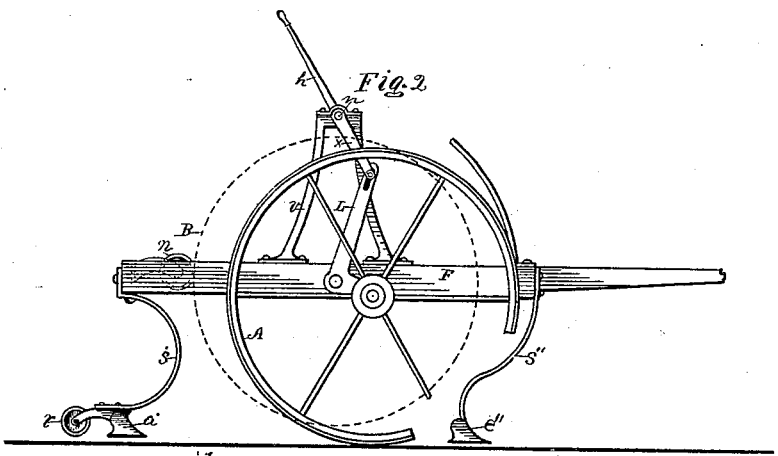
Figure 3:
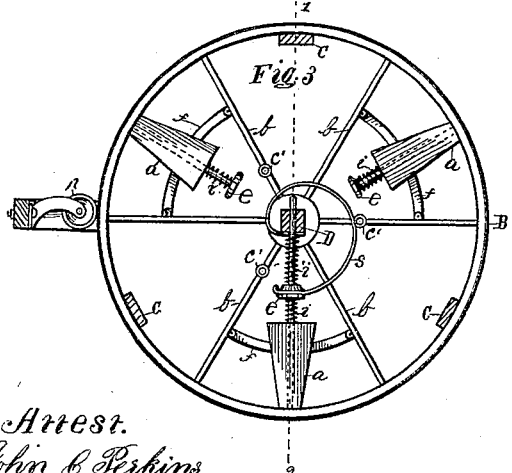

In the drawings forming a part of this specification, Figure 1 is a rear elevation of the planter; Fig. 2, a side elevation; Fig. 3, a planter-wheel, showing internal construction; and Fig. 4, a section on line 1 2 in Fig. 3.

F is the frame, provided with side wheels, A A, for supporting the planter when not in operation.

B B are the planter-wheels, located on an axle in regular order the distance apart intended for the rows of corn. They are made with double hubs $m\ m$, and two sets of spokes, $b\ b$, connecting with said hubs and the wide tire or rim.

Through the periphery of the wheel B are formed perforations $e'\ e'$, such a distance apart as the hills of corn would be, running transverse to the direction in which the planter moves.

Corn-boxes $a\ a$ are located within the wheel at each perforation $e'\ e'$. These boxes may be of any desirable form, and be provided with any practical arrangement for planting or delivering the corn from them through holes $e'\ e'$, which may be operated by vertical pistons $e\ e$. The corn-boxes here shown are rectangular in form, tapering toward the base.

A practical device for delivering the corn is to provide the perforated bottom of the box $a$ with a brush to prevent the corn falling through, but which will allow the corn to be forced through by the piston. This arrangement, aside from the piston, is not here shown.

S is a curved spring, secured to axle D between the hubs $m\ m$.

Figure 4:
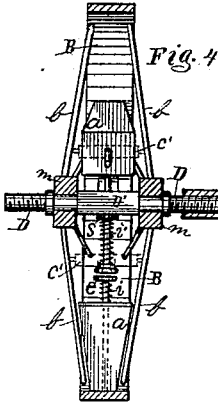

Bars $c'\ c'$ are secured to the spokes $b\ b$ across the wheel B, in a position to contract spring S as the wheel revolves, and adapted to release it at a point where the free end of said spring will force the piston $e$ downward in box $a$ as said boxes are brought in a proper position by the revolution of the planter-wheel, Figs. 3 and 4. As the pistons $e$ are provided with spring $i$, they are thrown up by said spring after the disengagement of spring S.

Boxes $a\ a$ are held in place by bars $f$, extending from one spoke to another.

If, for any cause, spring S should need to be held steadier at its free end, a rod, $i'$, may be employed connecting with said free end, and loosely extending through a hole in axle D. This rod may also be provided with a coil-spring, which assists the action of spring S, in which case said spring S may be of lighter steel.

The axles D D of wheels B B are screw-threaded, and screw into axle-sections $c\ c$, by which means the distance between said wheels and their position may be regulated. Axle-sections $c\ c$ are jointed by being pivoted together at $v'$, allowing the wheels B B to be raised and to rise and fall according to the surface of the ground.

To the rim of wheels B B are secured bars C C, to prevent one wheel from revolving faster than the other. These bars are severed between the wheels and connected by chains $t$, thus making said bars flexible in order to not retard the vertical play of any given wheel.

$v\ v$ are standards at the sides of frame F, sustaining the revoluble shaft $n$.

$h$ is a handle located near the driver's seat for operating shaft $n$.

$y'\ y'$ are bars connecting with the jointed axle-sections $c\ c$, and provided with hooks at the upper end, with which chains $y\ y$ are detachably coupled. Said chains $y\ y$ are connected with wheels on shaft $n$ in a manner so that wheels B B and their axles may be raised by revolving shaft $n$. The object of detachably connecting said chains is, that they may be unhooked when operating the planter to allow wheels B B with bars C C to revolve.

With each end of shaft $n$ are connected cranks X X, said cranks being located in slots in the upper end of levers L L.

Levers L are provided with a right-angled extension upon which wheels A A are journaled.

In the operation chains $y\ y$ are unhooked and wheels A A raised, as in Fig. 1, causing wheels B B to engage the ground. When turning the device around or removing from one field to another, chains $y\ y$ are hooked to bars $y'\ y'$, and wheels A A lowered by means of lever $h$, which operation also raises planting-wheels B, as in Fig. 2.

S″ is a spring-bar provided with a shovel, $e''$, located forward of each wheel B, for making a furrow to receive the corn, and S′ is a spring-bar provided with a covering-plow, $a'$, and roller $r$. By making said bars S′ S″ elastic they conform the plows to uneven ground and motion of the planter. In all conditions of soil these plows will not be needed. $n'$ is a friction-wheel located in the rear of each planter-wheel B, to prevent them from sagging backward by the springing of the axle.

Having thus described my invention, what I claim as new is—

1. A planter-wheel provided with the corn-boxes having the spring-actuated pistons, a curved spring, and means for contracting said spring and allowing it to expand at proper intervals in operating the pistons, all substantially as set forth.

2. A planter-wheel consisting of the double hubs, with two sets of spokes connecting the rim, provided with the corn-boxes having the spring-actuated piston, the curved spring, and the bars extending from one spoke to another across the wheel in position to contract said spring as the wheel revolves, all substantially as described.

3. A planter-wheel provided with a corn-box having a piston adapted to play vertically therein, a curved spring adapted to act upon said piston in operating it, and means for holding the free end of said spring in a yielding manner, substantially as described and shown.

4. In a corn-planter, the combination, with the frame, of the jointed axle, revoluble planter-wheels provided with the jointed bars connecting with their rim, and means for raising said planter-wheels, substantially as specified and shown.

5. In a corn-planter, the short wheel-axles having the screw-threaded ends, and the planter-wheels, combined with the axle-sections which are pivoted together, substantially as set forth.

6. The combination of the jointed axle, the planter-wheels, and side wheels, with the revoluble shaft, the bars and detachable chains connecting with the axle and revoluble shaft, the cranks, and the levers operating the end wheels, all substantially as specified, for the object stated.

7. The combination, with the planter-frame and the planter-wheels, of the friction-wheels located in the rear of said planter-wheels, for the object set forth, all substantially as described.

LEWIS N. LUSK.

Witnesses:
DANIEL F. SHAW,
FRANK C. GIBBS.